United States Patent

Chavarria

[15] 3,687,015
[45] Aug. 29, 1972

[54] HYDRAULIC LIFT FOR AUTOMOTIVE VEHICLES

[72] Inventor: Melchor J. Chavarria, Hipolito Irigoyen, 615 Buenos Aires, Argentina

[22] Filed: May 28, 1970

[21] Appl. No.: 41,357

[52] U.S. Cl............................................92/53, 92/132
[51] Int. Cl...................................................F01b 7/20
[58] Field of Search.......................92/51, 52, 53, 132

[56] References Cited

UNITED STATES PATENTS

| | | | |
|---|---|---|---|
| 1,031,528 | 7/1912 | Cole | 92/151 X |
| 1,230,562 | 6/1917 | Christensen | 92/132 |
| 1,279,500 | 9/1918 | Berry | 92/132 |
| 1,685,697 | 9/1928 | Guerin | 92/53 |
| 2,065,030 | 12/1936 | Sessions | 92/132 X |
| 2,231,680 | 2/1941 | Pfauser | 92/132 |
| 2,527,428 | 10/1950 | Kemerer | 92/51 X |
| 2,851,011 | 9/1958 | Chasser | 92/132 X |

Primary Examiner—Edgar W. Geoghegan
Assistant Examiner—Leslie J. Payne
Attorney—Ernest G. Montague

[57] ABSTRACT

A hydraulic lift for automotive vehicles having a plurality of tubular elements which communicate with each other with telescopic cooperation comprising a plurality of axially aligned cylinders, each of which is rigidly connected with a disc-shape transverse plate arranged at its upper base and provided with an elastic packing disposed thereon and having a peripheral edge which constitutes a friction ring with respect to the inner walls of each immediately preceding cylinder, the cylinders forming chambers of variable volume in a number of one per cylinder which communicate with one another through respective central conduits, and a helical tension spring passing through the conduits and extending from the upper cover of the uppermost cylinder to the lower end of the bottom cylinder.

7 Claims, 2 Drawing Figures

Patented Aug. 29, 1972
3,687,015
FIG. 1.
FIG. 2.
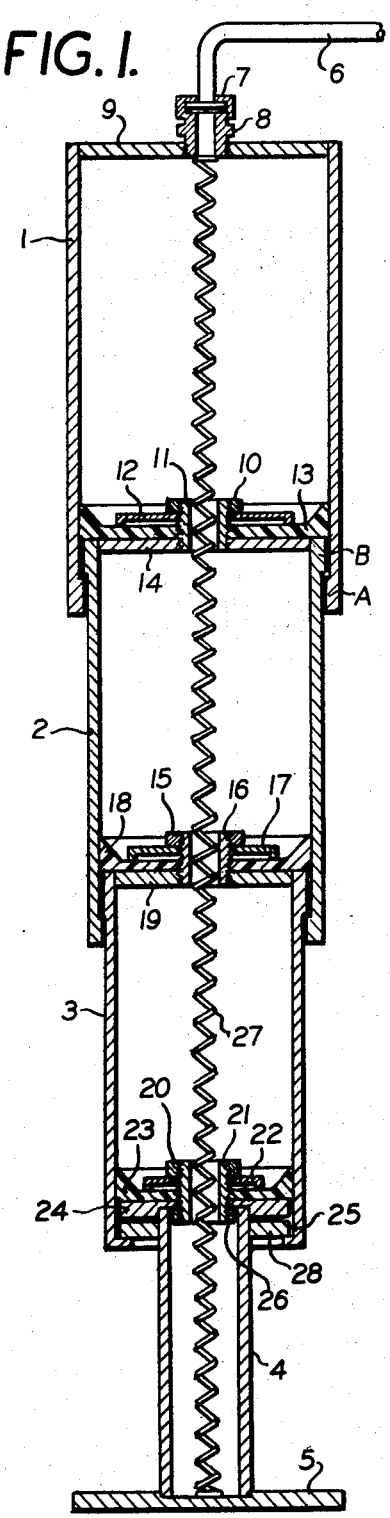
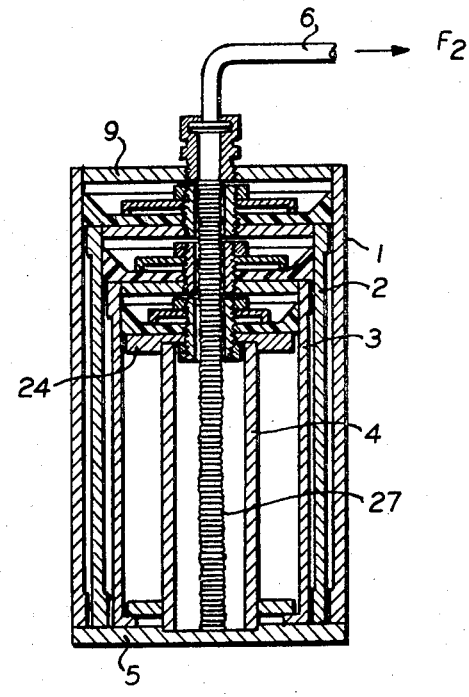
INVENTOR
MELCHOR JULIO CHAVARRIA
BY
ATTORNEY.

HYDRAULIC LIFT FOR AUTOMOTIVE VEHICLES

The present invention relates to improvements in hydraulic lifts for automotive vehicles.

More particularly, the present invention relates to improvements in telescopic cylinders which, grouped in independent units, are arranged in the vicinity of the four wheels of a vehicle.

Upon reducing to practice a more general arrangement of the present inventor, it was found that the cylinders require a special construction for their perfect operation, due to which it is possible to take advantage of the internal pressures of the hydraulic load under optimum conditions and without loss or leak of fluid, which result in drawbacks which are difficult to overcome and which may even lead to the possibility of non-use of the system or its rejection.

It is an object of the present invention to provide a hydraulic lift based on the measure of favoring the relative displacement between the different cylinders of each unit by providing a component of the inner pressure which is parallel to the axis of alignment of the units and at the same time applied to each of the grouped cylinders, thereby obtaining the result that as the entrance of the compressed liquid takes place, all the cylinders are displaced jointly and not at random.

This basic operating concept arises from the special formation, construction and composition of the cylinders referred to by the present invention which characteristics comprise the addition of transverse thrust planes supplemented by replaceable friction means which define air-tight chambers of variable volume corresponding to each of the cylinders which are grouped alongside of each of the wheels of the vehicle.

In view of the fact that the chambers communicate with each other, the internal pressure of all of them, for each of the groups independently of the other, is the same, so that the group of cylinders which receives the hydraulic charge to lift a wheel operates with relative displacement of its cylinders simultaneously, both at the time of extension and at the time of retraction.

With respect to the above-mentioned general arrangement to which the present invention constitutes a further improvement, the inner axial spring remains and is extended through aligned central perforations which pass through the transverse thrust planes, which perforations in their turn constitute the orifices for hydraulic intercommunication between the aforementioned chambers.

With these and other objects in view, which will become apparent in the following detailed description, the present invention will be clearly understood in connection with the accompanying drawing, in which:

FIG. 1 is an axial longitudinal section of a unit of telescopic cylinders which comprises a group adjacent one of the wheels of the vehicle, the group being in extended position, that is, the position which corresponds to the wheel when lifted; and FIG. 2 is a similar section through the same unit in retracted position, that is, with the wheel in lowered condition.

Referring now to the drawing, in both figures a hydraulic lift designed in accordance with the present invention comprises four axially aligned cylinders 1, 2, 3 and 4, the lower of which is provided with a supporting shoe 5. A conduit 6 enters at the top of the first cylinder 1 and is in hydraulic communication with a source of compressed liquid provided with regulating and control means (which do not form part of the features to which the present invention relates) and which permits the introduction of the liquid into the cylinders in the direction indicated by arrow $F_1$ or permits return in the direction indicated by arrow $F_2$.

The conduit 6 is connected to the upper cylinder 1 by a nut 7 and a short threaded pipe or bushing 8, which is arranged in the center of cover 9 for the upper cylinder 1, and is preferably threaded in the inner upper part of the side walls of the cylinder 1.

The following cylinder 2 is also provided with an upper cover 14 which constitutes its corresponding transverse thrust plane and comprises a strong cover 14, preferably threaded in the upper edge of the cylinder 2, and on which there is maintained an elastic circular packing 13, preferably made of synthetic rubber or the like, having a thickened edge constituting a friction ring applied against the inner walls of the upper cylinder 1. The packing 13 is fastened to the supporting cover 14 by a washer 12 with an undercut fastened by threading on a bushing 11 and held in place by a nut 10.

The lower edge of the cylinder 1 is provided with a radially inwardly directed annular flange A against which there abuts a radially outwardly directed annular flange B of the top of the cylinder 2, thus establishing the end of the relative stroke between the two cylinders 1 and 2.

The upper part of the third cylinder 3 also has its thrust plane shaped by parts 15 to 19, inclusive, which are entirely similar to those described in connection with the upper part of the preceding cylinder 2.

On the other hand, in the lower part of the cylinder 3 there is arranged a strong bottom 28 which constitutes the stop for the displacement of the bottom, or last, cylinder 4 of the unit, which is also provided with its thrust plane, but is formed with an outer upper plate 24 on which there is arranged its corresponding elastic packing 23 held by the parts 22, 21 and 20, respectively, which are similar to those already described in connection with the preceding cylinders, and by a lower nut 26, disposed about the threaded bushing 14 under a central recess in the cover 24.

An axial tension spring 27 extends, as has already been stated, throughout the entire unit and through the bushing or conduits 11, 16 and 21, its upper and lower ends being secured to the cover 9 of the cylinder 1 and to the supporting shoe 5, respectively.

When a hydraulic load is produced in the unit illustrated in the example, the compressed liquid enters through the tube 6, gradually filling all the cylinders in the small chambers included between the different thrust planes mentioned above, which chambers, as a result of the pressure, will increase in volume by relative displacements between the cylinders, thus lengthening the unit until the supporting shoe 5 rests on the ground. Upon the continuation of the introduction of the compressed liquid, the chambers will continue extending themselves, causing the lifting of the adjacent wheel to the level desired.

In order to return the wheel to its position of rest on the ground, it is merely necessary to reverse the direction of flow of the compressed liquid, in which case, first of all, the weight itself of the vehicle will cause the retraction of the unit of cylinders and, subsequently, the spring will cause the contraction to continue until the unit of cylinders is in the position indicated in FIG. 2.

While I have disclosed one embodiment of the present invention, it is to be understood that this embodiment is given by example only and not in a limiting sense.

I claim:

1. A hydraulic lift for automotive vehicles, comprising
   a plurality of tubular elements comprising a plurality of axially aligned cylinders of increasing diameter in an upward direction telescopically mounted and in fluid communication relative to one another,
   a disc-shape transverse plate rigidly connected to each cylinder, respectively, and substantially of the same diameter as that of said each cylinder, and arranged at the upper end of said each cylinder,
   a ring-shaped elastic packing substantially of disc shape disposed on said transverse plates and having a peripheral edge pressing against the inner cylindrical wall disposed there-around of the adjacent next higher cylinder and which constitutes a friction ring with respect to said inner cylindrical wall of said adjacent next higher cylinder,
   said cylinders forming chambers of variable volume in a number of one per cylinder,
   a central bushing of a diameter substantially smaller than that of said transverse plates and joined to and passing through each of said transverse plates and communicating the space of said chambers of respective adjacent cylinders,
   said elastic packing disposed about said bushing,
   means releasably secured to said bushings for securing said elastic packings against said transverse plates at a point inwardly of said peripheral edge of said packings, leaving said peripheral edge free,
   said central bushings being axially aligned with respect to each other and with respect to said cylinders,
   a helical tension spring extending through said cylinders and said bushings from said disc-shape transverse plate of the uppermost cylinder to the lower end of the lowermost cylinder and biasing said cylinders into a collapsed position and said hydraulic lift as a unit adapted to be arranged adjacent the four wheels of a vehicle.

2. The hydraulic lift, as set forth in claim 1, wherein
   said bushings are threaded on their external periphery,
   said means comprises, a washer disposed on each of said bushings and on said elastic packing, and
   a nut threaded on each of said bushings and holding said washer against said elastic packing.

3. The hydraulic lift, as set forth in claim 2, wherein
   said washer is recessed and has a cylindrical flange with a radius smaller than the peripheral edge of said elastic packing and pressing against said elastic packing, and
   said washer is threaded on said bushing.

4. The hydraulic lift, as set forth in claim 3, wherein
   said peripheral edge of said elastic packing is cylindrical.

5. The hydraulic lift, as set forth in claim 4, wherein
   said friction ring is formed with a radially and inclined upwardly directed bevel meeting said cylindrical peripheral edge at the top thereof.

6. The hydraulic lift, as set forth in claim 5, wherein
   pairs of adjacent cylinders are each formed with a radially inwardly directed annular flange at the bottom of the upper-most cylinder of said pair of adjacent cylinders and a radially outwardly directed annular flange on the top of the lower-most cylinder of said pair of adjacent cylinders and disposed above said inwardly directed annular flange and cooperating therewith as abutment stops limiting the relative stroke of said pair of adjacent cylinders, and
   said radially outwardly directed annular flange supporting freely said peripheral edge of said elastic packing thereabove.

7. The hydraulic lift, as set forth in claim 6, further comprising
   a lower-most nut threaded on a lower-most of said bushings underneath a lower-most of said transverse plates and disposed within a lowermost of said cylinders,
   a supporting shoe closing the lower-most end of said lower-most cylinder, and
   said spring being connected at one end to said supporting shoe and at its other end to the transverse plate of the upper-most of said cylinders.

* * * * *